Dec. 19, 1939.　　　R. B. PATTERSON　　　2,183,583
APPLICATION MACHINE FOR INSULATING MATERIAL
Filed March 19, 1937
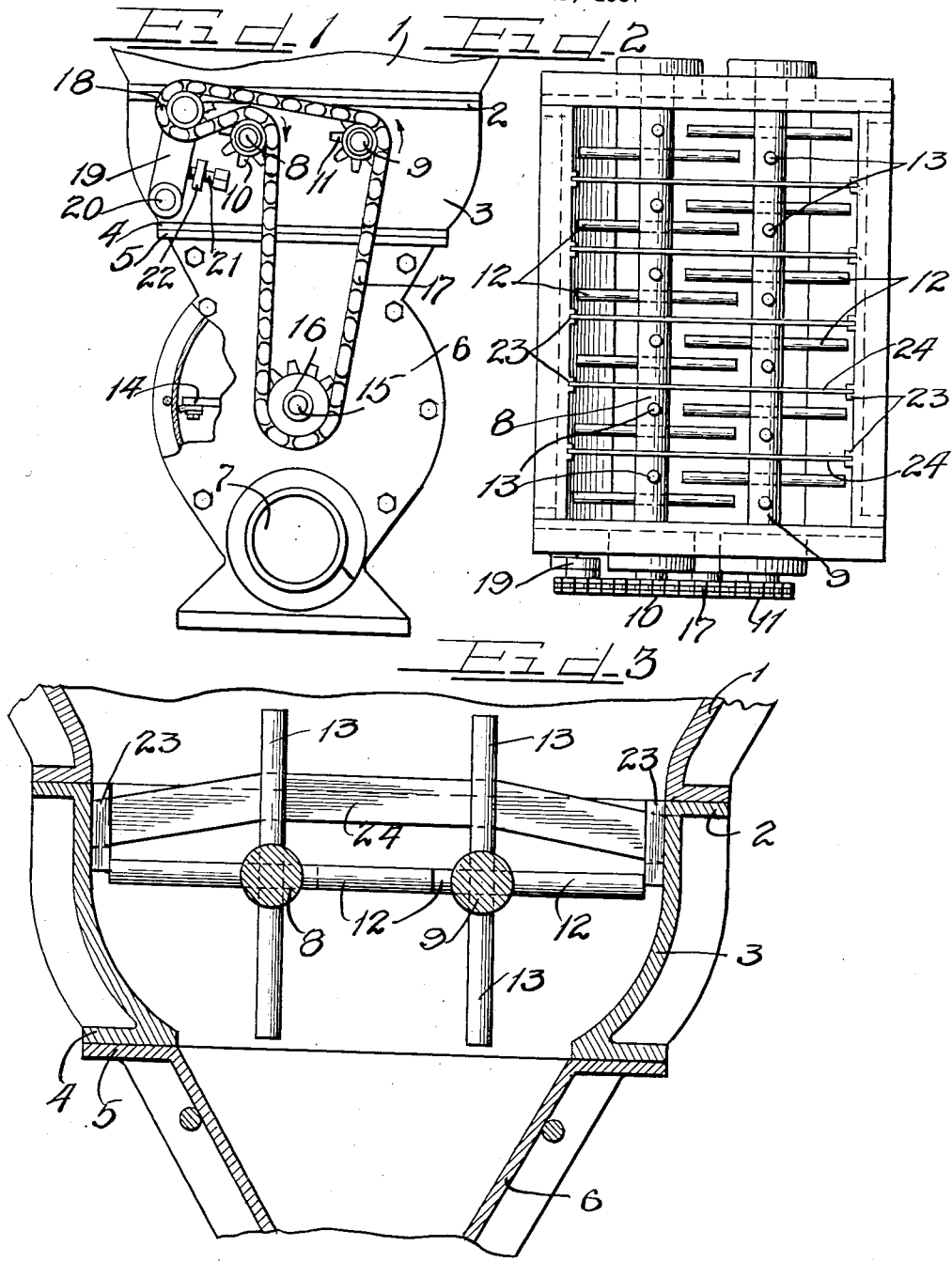
Inventor
Richard B. Patterson Patented Dec. 19, 1939

2,183,583

UNITED STATES PATENT OFFICE 2,183,583

APPLICATION MACHINE FOR INSULATING MATERIAL

Richard B. Patterson, Chicago, Ill., assignor to Patterson Manufacturing Company, Chicago, Ill., a corporation of Illinois Application March 19, 1937, Serial No. 131,870

4 Claims. (Cl. 83—6)

This invention relates to an application machine for insulating material.

In machines for applying insulating material, various means have been resorted to for the purpose of disintegrating the material before it reaches the exhaust stream. As a general rule, some picking mechanism has been provided that consists of relatively rotatable picking fingers.

In the Burt Patent 1,898,759 the picking fingers are mounted upon two parallel shafts and the fingers are staggered so as to cause no interference during operation.

In such picking mechanism as heretofore used the only purpose has been to loosen up the material so that it will be light and fluffy as set forth in the Burt patent. In none of these prior art machines has there been any attempt made to nodulate the material or cut it into pieces of approximately uniform size with the result that large wads or lumps would be blown from the machine that were objectional at the point of application.

In my copending application Serial No. 107,631, filed October 26, 1936, there was provided mechanism for shearing or nodulating the material in the form of a shearing plate and a rotary wheel with shearing blades cooperating therewith. While this machine produces a uniform and properly nodulated material that is highly desirable in many instances, the machine lacked the capacity that was desirable in other instances.

It is an object of this invention to greatly increase the nodulating capacity of such machines in the provision of a plurality of rotary cooperating members having fingers thereon that are so arranged and operated that the insulating material will be properly nodulated at a much higher rate of speed.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a side elevational view of an insulation application machine involving this invention.

Figure 2 is a top plan view of the machine.

Figure 3 is an enlarged fragmentary sectional view illustrating the nodulating mechanism.

In order to illustrate this invention, there is shown a machine which comprises a casing consisting of a hopper 1 secured to a radial flange 2 of a parti-concave member 3 having a radial flange 4 which is seated and secured upon a radial flange 5 of a housing 6 that forms a feeding chamber which communicates with an air blast passage 7 therebelow that is also formed in such housing. The upper end of the housing 6 converges from its top to the feeding chamber so that the material will converge as it falls into the feeding chamber.

The concave member 6 may be said to form a nodulating chamber or space between the hopper 1 and the feeding chamber. In this nodulating chamber there is located the novel nodulating mechanism that will now be set forth.

A pair of suitably spaced parallel shafts 8 and 9 are suitably journaled in the concave member 3 and project beyond the wall thereof upon one side of the machine for supporting gears 10 and 11.

Each shaft has a series of fingers 12 extending therethrough in the same plane, and a second series of fingers 13 extending therethrough in a plane at right angles to the plane of the first series. The fingers 12 on one shaft are staggered with relation to the fingers 12 on the other shaft. Likewise, the fingers 13 on one shaft are staggered in relation to the fingers 13 on the other shaft. However, the fingers 13 on one shaft are in the same vertical plane as the fingers 12 on the other shaft but spaced therefrom in operation by an arc of substantially 90°. It is therefore necessary to rotate shafts 8 and 9 in synchronism, or in other words at the same speed so that the fingers in the same rotary plane will not come into abutting relation.

In the feeding chamber which has a cylindrical interior there is a rotary impeller 14 that feeds the nodulated material to the air blast passage therebelow. This impeller is mounted upon a shaft 15 which extends beyond one side of the casing for supporting a sprocket wheel 16. A sprocket chain 17 is trained over the sprocket wheel 16 and the reaches of this sprocket chain are trained over the gear sprockets 10 and 11 and around a sprocket 18 which is mounted upon an adjustable bracket 19 which is pivoted at 20 to the casing and controlled by a screw bolt 21 threaded thru a lug 22 on the casing and abutting said bracket. The sprocket 16 is adapted to be driven in an anti-clockwise direction, a rotation which will cause shaft 9 to rotate in the same direction while shaft 8 will rotate in a clockwise direction. Thus the fingers on the shafts 8 and 9 will rotate toward each other in synchronism.

Upon the side walls of the nodulating chamber are spaced socket members 23. The sockets in these members are fully enclosed and support ends of transverse shear bars 24 which slope slightly downwardly as shown in Fig. 3.

It will be noted that the fingers 12 on one shaft extend between the fingers 12 on the other shaft as shown in Fig. 2, but the fingers 12 on one shaft do not bisect the spaces between the fingers 12 on the other shaft. The fingers 12 on one shaft instead of bisecting the spaces between the fingers 12 on the other shaft are closer to one straddling finger than the other. The distance from one finger 12 to one of the straddling fingers is about one third of the space between the straddling fingers and two thirds of such space to the other straddling finger. The transverse shear bars 24 are so arranged as to substantially bisect the two third spaces between a finger and the more remote straddling finger. The fingers 13 are similarly arranged with respect to each other and to the bars 24 as are the fingers 12 so that they function in the same way.

During operation, the insulating material such as rock wool for example, is deposited in the hopper 1 and falls upon the shear bars 24. As the fingers on the two shafts revolve and rise above the shear bars and approach each other, they will seize a portion of the wool therebetween and compress or squeeze it and as the fingers descend, they will cooperate with the shear bars to shear or tear the wool and form proper sized nodules.

It will be noted that as the adjacent fingers on the two shafts descend, the central angle therebetween becomes more and more obtuse so as to readily release the rock wool, while the lateral angles formed by the overlapping portions of the fingers become more acute and squeeze out the material that may be in such lateral angles. Thus the joint action of adjacent and cooperating fingers serves to discharge the wool thereby preventing the same from becoming entangled on the fingers.

As the fingers 12 on one shaft revolve, the pins 13 on the other shaft will rotate directly therebehind at an angle of 90° and will cooperate with the shear bars 24 and the fingers 13 on the other shaft as above set forth. Due to the fact that the shafts 8 and 9 are synchronized, the fingers on the two shafts will maintain the proper relation as shown.

The material treated or nodulated by the fingers will drop into the feed chamber from which it will be discharged by the rotor in substantial measured quantities to the air blast passage.

The nodulating or disintegrating mechanism set forth not only properly disintegrates the material but it does so at a greatly increased speed. It is therefore capable of handling a much larger quantity in a given time than prior machines. This is largely due to the arrangement of the fingers on the two shafts so that the material is forced therefrom and cannot become entangled thereon.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a machine for the treatment of insulating material, a casing, a pair of horizontally spaced parallel shafts journaled in said casing, cylindrical fingers upon each of said shafts including a set of fingers on one shaft that travel in the same plane of rotation as the fingers of a corresponding set upon the second shaft but in angularly spaced relation thereto, said shafts being sufficiently closely spaced to cause the fingers upon different shafts in each of said sets to rotate in overlapping relationship, shear bars secured in said casing above said shafts and positioned to be overlapped by said fingers and means for rotating said shafts in opposite directions in synchronism.

2. In a machine for the treatment of insulating material, a casing, a pair of parallel horizonally spaced shafts journaled in said casing, spaced fingers having smoothly rounded surfaces mounted upon each shaft, pairs of fingers on one shaft being in the same planes of rotation as corresponding pairs of fingers on the other shaft, shear bars secured in said casing above said shafts and positioned to be overlapped by said fingers, said shafts being spaced apart a distance slightly greater than the radius of the circle described by the ends of said fingers to cause overlapping of the fingers in corresponding pairs during rotation and means for rotating said shafts in synchronism.

3. In an apparatus for breaking and splitting up insulating material such as rock wool comprising a chamber for receiving material, a transverse shear in said chamber with spaces on opposite sides thereof through which material is to be forced past shearing edges of said shear, and a plurality of rotary tearing finger-like elements mounted on parallel shafts and being parallel to said shear edges for forcing material through said spaces and by said edges, means for rotating said shafts in opposite directions, the elements on one shaft moving toward a longitudinal center line of said chamber from one side of the line, there being one element for each of said spaces, and the elements on the other shaft moving from the opposite side of said line toward the line and in an opposite direction from that of the elements of the other shaft, there likewise being one finger element for each of said spaces so that the combined elements of said shafts comprise two for each space, the elements of one shaft being staggered relative to the elements of the other, and said elements being so arranged that as they approach said line they overlap each other and thus the elements on each side of the shear crowd and tear the material past and by said shearing edges.

4. In an apparatus for breaking and splitting up insulating material such as rock wool comprising a chamber for receiving material, a transverse shear in said chamber with spaces on opposite sides thereof through which material is to be forced past shearing edges of said shear, and a plurality of rotary tearing finger-like elements mounted on parallel shafts and being parallel to said shear edges for forcing material through said spaces and by said edges, means for rotating said shafts in opposite directions, the elements on one shaft moving toward a longitudinal center line of said chamber from one side of the line, there being one element for each of said spaces, and the elements on the other shaft moving from the opposite side of said line toward the line and in an opposite direction from that of the elements of the other shaft, there likewise being one finger element for each of said spaces so that the combined elements of said shafts comprise two for each space, the elements of one shaft being staggered relative to the elements of the other, and said elements being so arranged that as they approach said line they overlap each other and thus the elements on each side of the shear crowd and tear the material past and by said shearing edges, and additional sets of finger elements on each of said shafts staggered relative to the first-mentioned elements and disposed ninety degrees therefrom, for following through after said first-mentioned elements have moved past said shearing edges, to continue the operation.

RICHARD B. PATTERSON.